United States Patent [19]
Emshoff et al.

[11] 4,434,058
[45] Feb. 28, 1984

[54] COOLING ARRANGEMENT AND METHOD OF OPERATING THE ARRANGEMENT

[75] Inventors: Horst W. Emshoff, Mülheim; Walter Küsebauch, Erlangen, both of Fed. Rep. of Germany

[73] Assignee: Siemens Aktiengesellschaft, Munich, Fed. Rep. of Germany

[21] Appl. No.: 284,497

[22] Filed: Jul. 17, 1981

[30] Foreign Application Priority Data

Jul. 18, 1980 [DE] Fed. Rep. of Germany ....... 3027322

[51] Int. Cl.³ ............................................. B01J 47/14
[52] U.S. Cl. .................................. 210/662; 210/685; 210/686; 210/96.1; 210/284
[58] Field of Search ............... 210/662, 663, 669, 685, 210/686, 96.1, 167, 284, 290, 900

[56] References Cited
U.S. PATENT DOCUMENTS 2,934,655  4/1960  Heller et al. ......................... 310/55
3,454,491  7/1969  Colburn .............................. 210/662
3,711,731  1/1973  Pluschke ............................. 310/63
3,870,033  3/1975  Faylor et al. ....................... 210/900
4,120,787  10/1978 Yargeau .............................. 210/167

OTHER PUBLICATIONS

VGB-Kraftwerkstechnik 59, Sep. 1979.

Primary Examiner—Ivars C. Cintins
Attorney, Agent, or Firm—Kenyon & Kenyon

[57] ABSTRACT

A cooling arrangement particularly for cooling electrical devices having water cooled electric conductors with deionized cooling water in a closed cooling system which contains a parallel loop with a mixed bed filter in which an anion exchanger in OH form is provided which can be connected parallel with the mixed bed filter as well as in series with the mixed bed filter, permitting the cooling system to be run with the cooling water having an increased pH-value range which can be preferably 8 to 8.4.

5 Claims, 1 Drawing Figure

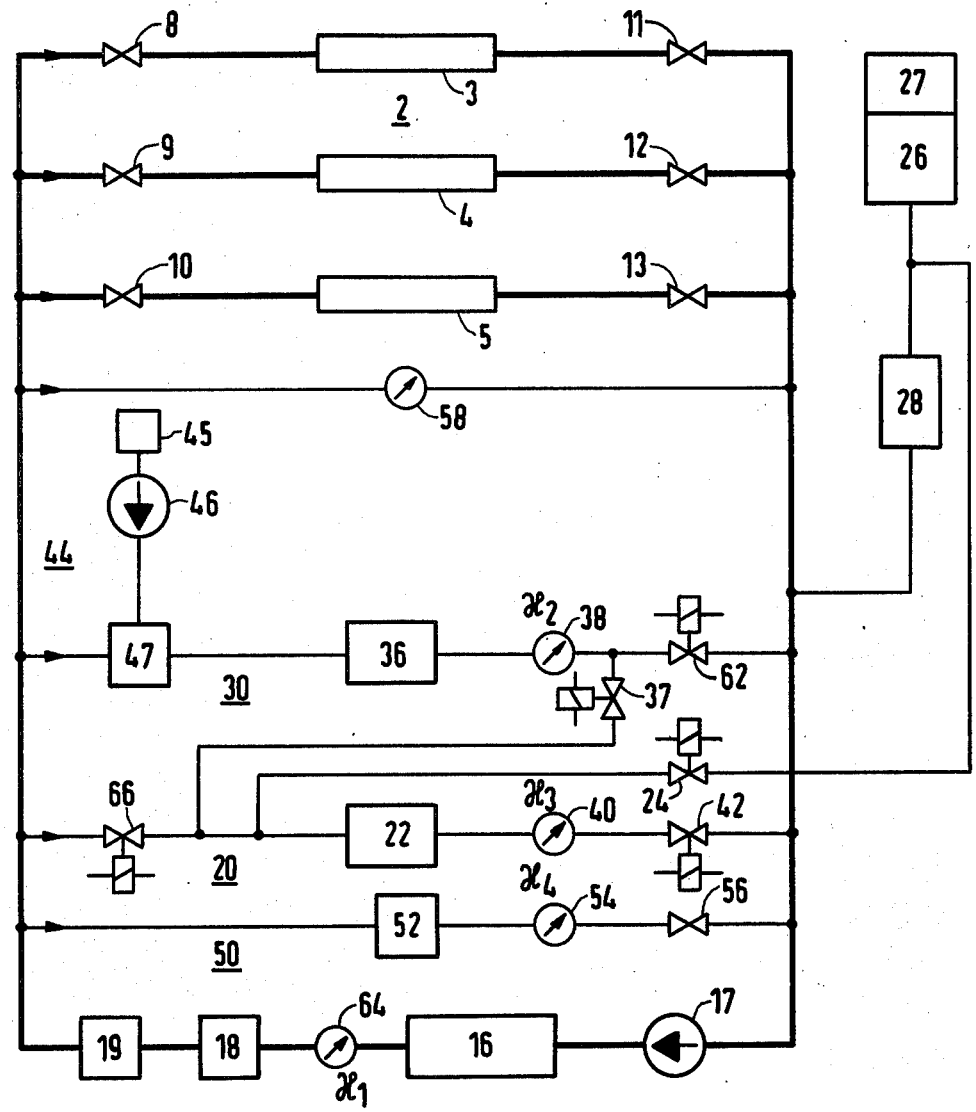

COOLING ARRANGEMENT AND METHOD OF OPERATING THE ARRANGEMENT

BACKGROUND OF THE INVENTION

This invention relates to cooling arrangements in general and more particularly to an arrangement for cooling electrical devices having water cooled electric conductors, with deionized cooling water and a closed cooling system which contains a main loop and at least one parallel loop with a mixed bed filter.

For cooling electrical devices of high power rating, for instance generators and travelling field tubes as well as heavy duty cables, closed cooling systems are provided, as is well known. These cooling systems contain deionized cooling water, so-called deionate. The cooling water flows through the current carrying conductors of the device which generally consist of copper or copper alloys.

As is well known, secondary loops are provided for cooling particularly sensitive cooling places, for instance, the cooling heads and seals of boiler circulating and boiler feed pumps in power generating stations; these coolant loops are likewise constructed as closed cooling loops and may be provided with a mixed bed filter. In order to keep the electrolyte content in the cooling system as low as possible, a small partial stream of the cooling water which may amount to, for instance, about 0.5 to 5%, can be conducted via a parallel loop which contains the mixed bed filter. The cooling water in such a cooling system has a very low electric conductivity which can be less than 1 $\mu$S/cm. Part of the copper or the copper alloy may be removed by the cooling water through corrosion and be deposited again at other points or in following parts of the system. The corrosion removal rate depends on the pH value of the cooling water and decreases with increasing pH value. The pH value has therefore been raised in secondary cooling loops in power generating stations to at least 9 (VGB-Kraftwerkstechnik 59, September 1979, pp. 720 to 724).

It is an object of the present invention to prevent deposits, especially due to corrosion, in closed cooling systems with deionized cooling water, particularly for cooling electrical devices of high power rating, having electric conductors, through which cooling water flows.

SUMMARY OF THE INVENTION

The existing mixed bed filter which, as is well known, has as its purpose filtering metal ions, for instance copper, nickel and iron ions and anions, for instance HCO$_3$ ions, from the cooling water is an obstacle to alkalizing the cooling water in the cooling system. The mixed bed filter generally contains an H loaded cation exchanger and an OH loaded anion exchanger. If sodium hydroxide is used as an alkalizer, sodium ions are filtered out of the loop again in the cation exchanger. A predetermined pH value can be maintained by constantly adding alkalizers. However, this causes the cation exchanger to be consumed thereby and requires that it be renewed correspondingly often.

According to the present invention these difficulties can be avoided in a cooling arrangement in which an anion exchanger in OH form is provided which can be connected in series or parallel with the mixed bed. In this cooling arrangement, the mixed bed filter is used only during the starting of the electrical device and in normal operation is conducted through the anion exchanger.

When starting up the cooling arrangement, a partial stream of the cooling water can be conducted via the mixed bed filter and a further partial stream via the anion exchanger and the mixed bed filter, until the water in the main loop has reached a conductivity of not more than 0.1 uS/cm. Then, the mixed bed is taken out of operation and only the anion exchanger is still operted. Ahead of the anion exchanger, a predetermined amount of alkalizer, preferably sodium hydroxide, which is required for alkalizing the cooling water, is slowly added via a mixer to the partial stream of the cooling water in a parallel loop, and thereby, the pH value of the cooling water in the main loop is raised.

In normal operation, the partial stream of the cooling water is generally conducted only via the anion exchanger, which removes bicarbonates, in particular, from the cooling water. A pH value correction is possible by passing the water through a mixed bed filter if, for instance, an upper limit of the ph value is reached, or, by adding alkalizer if the pH value drops below a longer limit. At a pH value of about 8.3, the dissolved copper ion concentrations expected according to the Pourbaix diagram under equilibrium conditions, as well as the iron and the nickel ion concentrations are very low and contribute therefore only little to the conductivity of the water. A stable equilibrium with a low upper level will adjust itself.

In a preferred embodiment of the arrangement for cooling electrical devices, an additional parallel loop may further be provided which contains an H loaded cation exchanger in series with a conductivity measuring cell. With this arrangement, the pH value of the cooling water can be determined in a simple manner to a very good approximation. The method includes measuring the electric conductivity of the cooling water in the main loop and, at the same time, the conductivity in the additional parallel loop of the cooling water behind the cation exchanger. From these measurements the H ion concentration of the cooling water can be derived in a simple manner, wherefrom the pH value is obtained. By way of this simple pH value determination, the cooling loop can be run in a predetermined range between the two limits of the pH value.

BRIEF DESCRIPTION OF THE DRAWING

The single FIGURE is a schematic representation of an embodiment of a cooling arrangement according to the present invention.

DETAILED DESCRIPTION OF THE INVENTION

In the FIGURE, an arrangement for cooling an electrical device having water cooled electric conductors, for instance, a generator 2 is shown. The arrangement includes separate cooling tube systems for the stator winding 3, the rotor winding 4, and the stator lamination stack 5. The tube systems are arranged in the main cooling loop parallel to each other, each in series with two valves, respectively valves 8 and 11, 9 and 12 and 10 and 13. In the stator winding 3 and the rotor winding 4, the cooling tube system is formed in each case substantially by the electric conductors. The valves 8 to 13 may preferably be throttling valves. The main loop also contains a heat exchanger 16, a circulating pump 17, a mechanical filter 18, and a magnetic filter 19.

In a parallel loop, a mixed bed filter 22 is provided, the input of which may also be connected via a magnetic valve 24 to an expansion vessel 26, which receives fresh cooling water and is closed off from the ambient atmosphere by a nitrogen cushion 27. From the expansion vessel 26, the cooling water losses from the cooling loop are made up. These typically may be, for instance, about 1 liter per day. This fresh cooling water can contain oxygen, carbon dioxide, and further foreign ions. The conductivity of this fresh water can therefore advantageously be reduced by introducing it into the cooling loop via the valve 24 and the mixed-bed filter 22. In some circumstances it may be advisable to feed the fresh cooling water to the low pressure side of the cooling loop via a separate mixed bed filter 28.

Parallel to the mixed bed filter 22 a further parallel loop 30 is provided which contains an anion exchanger 36 in OH form which is connected via a valve 37 which may preferably be a remotely controlled valve as well as through a connecting line, not specifically designated in the figure, to the input of the mixed bed filter 22. The anion exchanger 36 can therefore be connected in parallel to the mixed bed filter 22 as well as also in series. The parallel loop 30 contains a conductivity measuring cell 38 which is arranged behind the anion exchanger 36. A further conductivity measuring cell 40 is arranged in series with a value 42 which may preferably be a magnetic valuve, in parallel loop 20, behind the mixed bed filter 22. It is used for monitoring the functioning of the mixed bed filter 22. In the parallel loop 30, ahead of the anion exchanger 36, a feed 44 for an alkalizer which may, for instance, be sodium hydroxide is provided. The feed 44 consists of a tank 45, a dosing pump 46, and a mixer 47.

Parallel to the main loop, a measuring device 58 for measuring the oxygen content in the cooling water is further provided.

Through the design of the cooling system with the parallel loops 20 and 30, the pH value is to be preferably held in the range between about 8 and 8.4 in the arrangement for cooling the generator 2.

When starting the operation, the dosing pump 46 is initially shut off and a magnetic valve 62 arranged in the parallel loop 30 closed. The valves 37 and 42 as well as a valve 66 arranged in the parallel loop 20 ahead of the mixed bed filter 22 are open. The cooling water is deionized by means of mixed bed filter 22 which contains an H loaded cation exchanger and an OH loaded anion exchanger. The anion exchanger 36 through which the partial stream in the parallel loop 30 flows is cleaned. As soon as the electric conductivity $x_1$ in the main loop, which can be measured with the conductivity measuring cell 64, and the conductivity $x_2$ behind the anion exchanger 36 have reached a predetermined lower limit, for instance, 0.1 $\mu$S/cm, the valves 37 and 66 are closed, the valve 62 is opened and the feed 44 of alkalizer is set in operation by turning the dosing pump 46 on. Through the feed 44, for instance, sodium hydroxide, generally in diluted form, for instance, in a concentration of $2.10^{-3}$ n NaOH solution, is added and the Ph value of the water in the cooling system is raised until a predetermined pH value, for instance, 8.3 is reached. Then the dosing pump 46 is shut down.

If the pH value in normal operation reaches an upper limit, for instance 8.4, then the valve 66 is opened and the excess Na$^+$ ions are exchanged in mixed bed filter 22 for H$^+$ ions. If the pH value drops below the predetermined value, then the valves 37 and 66 are held closed and the feed 44 for sodium hydroxide is set in operation again with the valve 62 opened.

The valve 24 remains and is opened for feeding fresh water only, if the valve 66 is closed because of the different pressure conditions.

Therefore, a partial stream of the cooling water is first fed to the arrangement via the anion exchanger 36 and, additionally, via the mixed bed filter 22 until the electric conductivity $x_1$, in the main loop and the electric conductivity $x_2$ behind the anion exchanger 36 reach a predetermined low value. Then the mixed bed filter 22 is disconnected and only the anion exchanger 36 is operated. Sodium hydroxide is fed to the main loop from the feed 44 via the anion exchanger 36 as an alkalizer until a predetermined pH value is reached. With this mode of operation, a stable equilibrium with a low upper level in the cooling loop adjusts itself.

The conductivity measuring cells 38 and 64 as well as a further conductivity measuring cell 54 can preferably serve at the same time as a signal generator for monitoring and controlling the pH value and consist of a combination of a measuring cell with a measuring value converter.

In the illustrated embodiment, the feed 44 of the alkalizer is arranged ahead of the anion exchanger 36. Under some conditions it may be advisable to arrange the feed 44 in the main loop, preferably ahead of the circulating pump 17.

In one preferred embodiment of the cooling arrangement, the pH value of the cooling water can be determined in a simple manner by means of an additional parallel loop 50 which contains a cation exchanger 53, a conductivity measuring cell 54 and a throttling valve 56. The pH value can be determined by measuring the electric conductivity $x_1$ in the main loop by means of the conductivity measuring cell 64 and by measuring a further conductivity 3 by means of the conductivity measuring cell 54 in the parallel loop 50 behind the cation exchanger 52, which may preferably contain an H loaded resin.

The conductivity in the main loop is caused by cations and anions which can be divided into two groups. To the first group belong the Na$^+$ ions of the alkalizer and metal ions such as, for instance, positive copper, iron, or nickel ions, in which the OH$^-$ anion is present as a partner. To the second group belong all cations which have another anion as a partner. If this water flows through the hydrogen loaded cation exchanger 52, the cations of the first group are exchanged for the H$^+$ ions, and water is formed. The conductivity contribution takes place only via dissociation of the water. The cations of the second group are likewise exchanged for H$^+$ ions; however, they contribute to the conductivity like the corresponding anions. For low concentrations, complete dissociation can be assumed and the conductivity is therefore found from the degree of dissociation, approximately 1, the charge number and the mobilities as well as the concentration of the ions. The limits of ion mobility in aqueous solution are known. Since the conductivity of the cation and the anions are proportional to their mobilities, the conductivity of the OH$^-$ ions can be calculated in very good approximately and the pH value is then obtained as the negative logarithm of the H ion concnetration from:

$$pH = -\log\frac{1_K + 1_{OH}}{1000} \cdot K_W + \log\left(X_1 - \frac{1_A + 1_K}{1_H + 1_A} \cdot x_4\right)$$

where:

$1_K$ is the mean ion mobility of the cations $Na^+$, $Cu^{++}$, $Ni^{++}$, $Fr^{++}$ present in the cooling loop if sodium hydroxide is used as the alkalizer, and $1_{OH}$—the $OH^-$ ion mobility and $K_w$—the ion product of the water, and $1_A$—the mean ion mobility of the anions $HCO_3^-$, $CO_3^{--}$, $SO_4^{--}$, $CL^-$ present in the cooling loop, and $1_H$—the $H^+$ ion mobility These variables are temperature dependent. For a temperature of, for instance, 298 K., the pH value is obtained in very good approximation from the simplified relation With this simple pH value determination, the pH value in the cooling loop can be held in a range between an upper and a lower limit.

In the illustrated embodiment sodium hydroxide NaOH is provided as the alkalizer. However, other alkalizers, for instance, potassium hydroxide KOH, lithium hydroxide LiOH and also hydrazine $N_2H_4$ as well as ammonia $NH_3$ can be used.

If instead of sodium hydroxide another alkalizer is used, the constants used in the relation given for the pH value are adapted accordingly.

What is claimed is:

1. In a cooling arrangement having deionized cooling water in a closed cooling system which contains a main loop, a parallel loop with a mixed bed filter, and means for feeding an alkalizer, the improvement comprising an anion exchanger in OH form and means for connecting said anion exchanger either in parallel with the mixed bed filter or in series with the mixed bed filter.

2. The improvement according to claim 1, wherein said means for feeding an alkalizer are disposed ahead of the anion exchanger, said anion exchanger and said mean for feeding forming a parallel loop.

3. The improvement according to claim 1 or 2, and further including an additional parallel loop having a cation exchanger in H form in series with a conductivity measuring cell and a conductivity measuring cell disposed in the main loop.

4. A method for operating a cooling arrangement which includes a closed cooling system with deionized cooling water having a main loop; a parallel loop with a mixed bed filter; means for feeding an alkalizer; and an anion exchanger adapted to be connected either in series or parallel with the mixed bed filter, comprising conducting a partial stream of the cooling water via the anion exchanger, and feeding an alkalizer in if the pH value in the main loop is below a lower value and connecting the anion exchanger in series with the mixed bed filter if the pH value of the cooling water reaches an upper limit.

5. A method for operating a cooling arrangement including a closed cooling system with deionized cooling water having a main loop; a parallel loop with a mixed bed filter; means for feeding an alkalizer; and an anion exchanger adapted to be connected either in series or parallel with the mixed bed filter, comprising, when starting up, conducting a partial stream of the cooling water through the anion exchanger and the mixed bed filter until the electric conductivity in the main loop and the electric conductivity behind the anion exchanger is reduced to a predetermined low value; and then turning the mixed bed filter off and conducting the partial streams exclusively via the anion exchanger, and feeding alkalizer to the cooling water until the pH value is raised to a predetermined value.

* * * * *